United States Patent
Nambiar

Patent Number: 5,141,420
Date of Patent: Aug. 25, 1992

[54] SCROLL COMPRESSOR DISCHARGE VALVE

[75] Inventor: Koman B. Nambiar, Sidney, Ohio

[73] Assignee: Copeland Corporation, Sidney, Ohio

[21] Appl. No.: 539,428

[22] Filed: Jun. 18, 1990

[51] Int. Cl.⁵ .................. F04C 18/04; F04C 29/00; F16K 15/02; F16K 27/04

[52] U.S. Cl. .................. 418/55.1; 418/270; 137/220; 137/528; 137/533.17; 417/902

[58] Field of Search ............ 418/55.1, 270; 137/220, 137/528, 533.17; 417/902

[56] References Cited

U.S. PATENT DOCUMENTS

| | | |
|---|---|---|
| 550,730 | 12/1895 | Stone . |
| 1,359,006 | 11/1920 | Wardwell . |
| 1,593,519 | 7/1926 | Underwood . |
| 2,646,071 | 7/1953 | Wagner . |
| 2,908,109 | 10/1959 | Rotwein . |
| 3,060,959 | 10/1962 | Foster . |
| 3,176,712 | 4/1965 | Ramsden . |
| 3,790,311 | 2/1974 | Butts et al. ............ 417/410 |
| 4,277,955 | 7/1981 | Parker ............ 62/510 |
| 4,369,808 | 1/1983 | Hagman ............ 137/533.17 |
| 4,369,812 | 1/1983 | Paradis et al. ............ 137/843 |
| 4,431,388 | 2/1984 | Eber et al. ............ 417/295 |
| 4,513,784 | 4/1985 | Farrand et al. ............ 137/854 |
| 4,531,543 | 7/1985 | Markley ............ 137/515.7 |
| 4,560,330 | 12/1985 | Murayama et al. ............ 417/410 |
| 4,744,737 | 5/1988 | Yamamura et al. ............ 417/902 |
| 4,759,696 | 7/1988 | Ishiai ............ 418/270 |
| 4,877,382 | 10/1989 | Caillat et al. ............ 418/57 |
| 4,904,165 | 2/1990 | Fraser, Jr. et al. ............ 417/312 |

FOREIGN PATENT DOCUMENTS 1205135  8/1959  France ............ 137/533.17

OTHER PUBLICATIONS

Copeland Drawing 010-0029-00, Jun. 1987.

*Primary Examiner*—John J. Vrablik
*Attorney, Agent, or Firm*—Harness, Dickey & Pierce

[57] ABSTRACT

A scroll type hermetic compressor is disclosed which incorporates an improved disc type check valve in the discharge conduit exiting from the compressor shell. The check valve operates to prevent return of high pressure refrigerant which may cause reverse movement of the orbiting scroll upon shut down of the compressor.

16 Claims, 2 Drawing Sheets

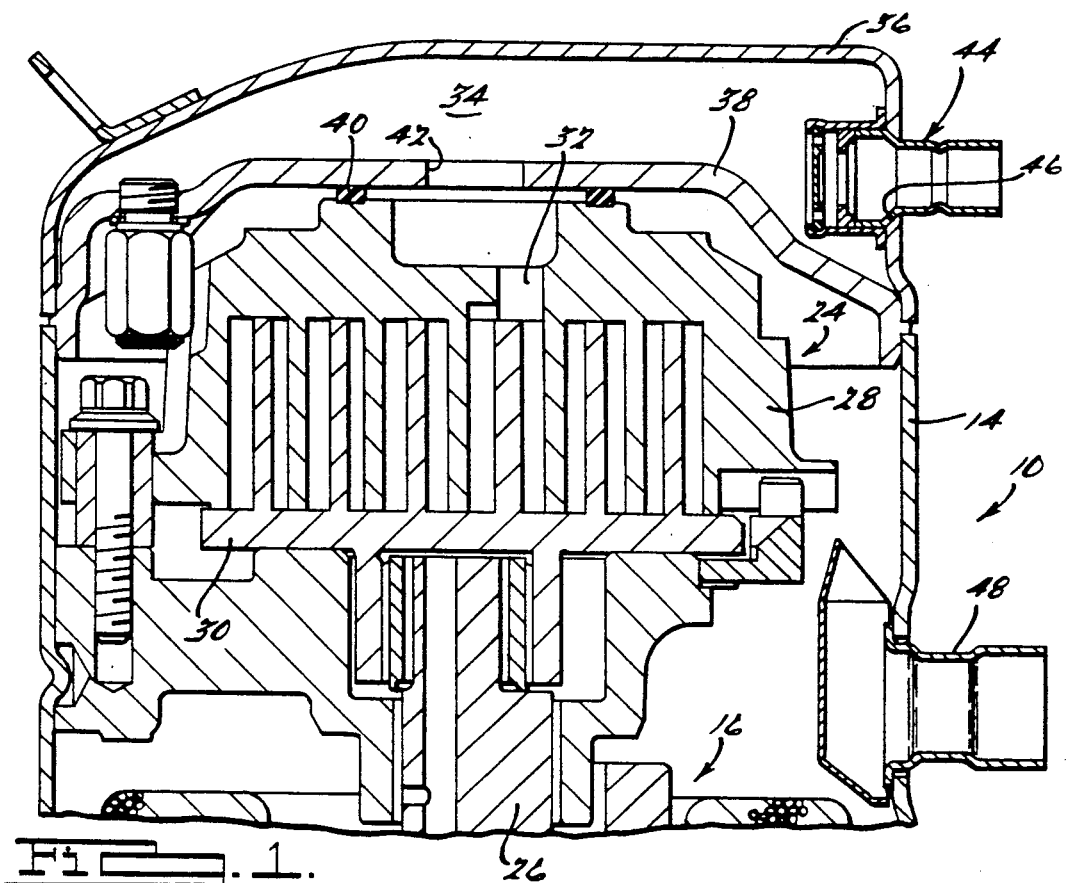
Fig. 1.
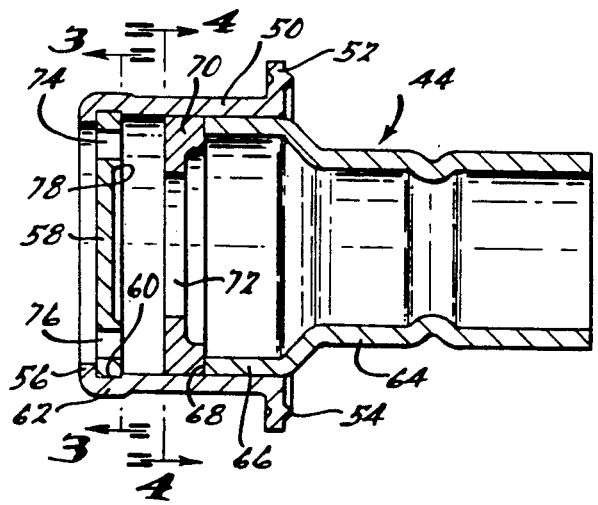
Fig. 2.
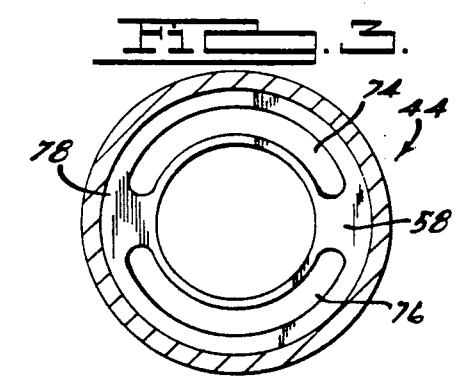
Fig. 3.
Fig. 4.

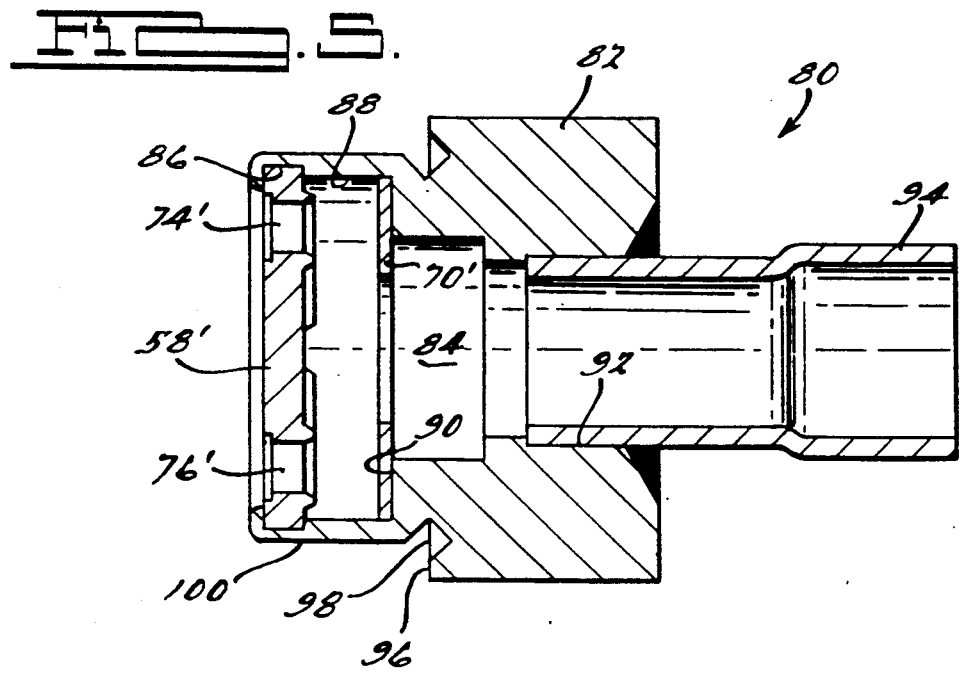
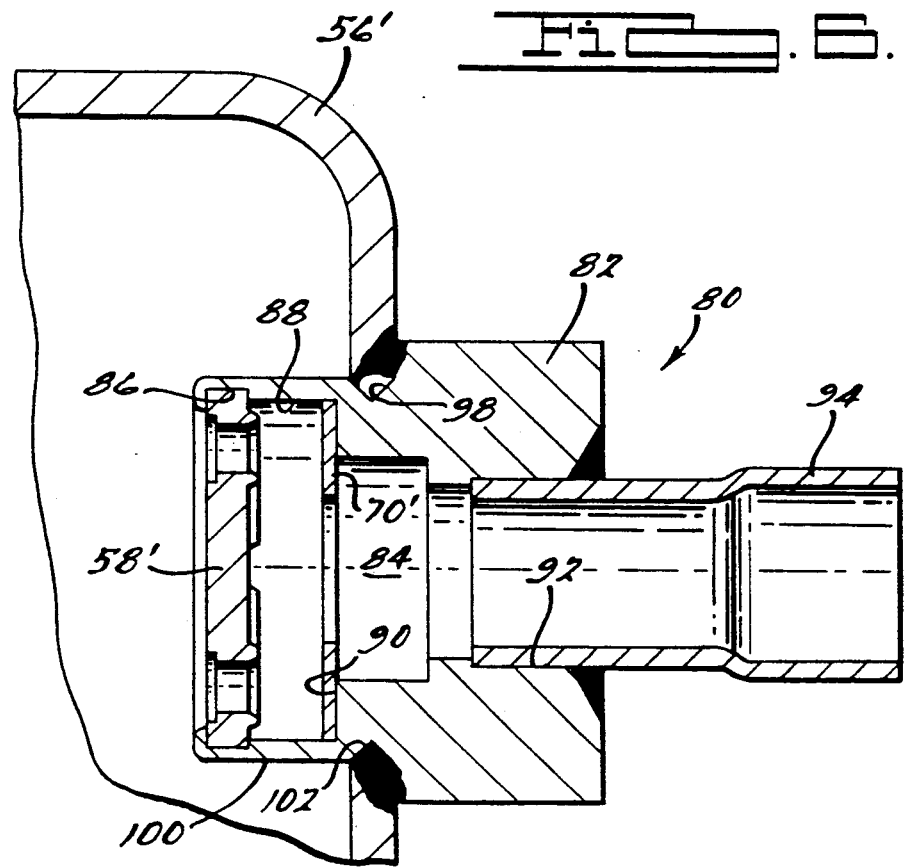

SCROLL COMPRESSOR DISCHARGE VALVE

BACKGROUND AND SUMMARY OF THE INVENTION

The present invention relates generally to scroll compressors and more specifically to such scroll compressors incorporating discharge valving for preventing reverse orbital motion thereof.

Scroll type machines are becoming more and more popular for use as compressors in both refrigeration as well as air conditioning applications due primarily to their capability for extremely efficient operation. Generally, these machines incorporate a pair of intermeshed spiral wraps, one of which is caused to orbit relative to the other so as to define one or more moving chambers which progressively decrease in size as they travel from an outer suction port toward a center discharge port. An electric motor is provided which operates to drive the orbiting scroll member via a suitable drive shaft. Because scroll compressors depend upon a seal created between opposed flank surfaces of the wraps to define successive chambers for compression, suction and discharge valves are generally not required. However, when such compressors are shut down, either intentionally as a result of the demand being satisfied or unintentionally as a result of a power interruption, there is a strong tendency for backflow of compressed gas from the system in combination with high pressure gas contained in the chambers and/or discharge muffler to effect a reverse orbital movement of the orbiting scroll member and associated drive shaft. This reverse movement often generates objectionable noise or rumble. Further, in machines employing a single phase drive motor, it is possible for the compressor to begin running in the reverse direction should a momentary power failure be experienced.

In order to limit such reverse rotation, scroll compressors have incorporated ball type check valves at the point of connection between the outer shell and discharge line. While such ball type check valves have been effective to limit backflow of compressed refrigerant, they have demonstrated a tendency to vibrate or chatter under certain flow conditions thus presenting a further source of objectionable noise. Also, in severe situations, the chattering may result in damage or destruction of the ball stop and/or seat. Additionally, the occasional discharge of liquid through such ball type check valves further increases the possibility of damage thereto.

The present invention overcomes these problems by incorporating a disc type check valve in the outlet from the outer shell which effectively prevents return flow of compressed gas from the refrigeration system and hence limits reverse orbital movement of the orbiting scroll member. Because reverse orbital movement is thus limited, the possibility of objectionable noise being generated thereby upon shut down of the compressor is greatly reduced. The disc type discharge valve does not require any biasing means but rather operates to create a pressure differential thereacross which moves the disc between seated and unseated positions. The disc type discharge valve of the present invention provides an inexpensive, easily installed means to effectively resist reverse movement of the orbiting scroll. Further, because a relatively large stop surface area is provided extending around the periphery of the valve member, the possibility of damage from discharge of liquid therethrough is greatly reduced. In one form, the disc type discharge valve is specifically designed to be secured to the outer shell by spin welding.

Additional advantages and features of the present invention will become apparent from the subsequent description and the appended claims taken in conjunction with the accompanying drawings.

BRIEF DESCRIPTION OF THE DRAWINGS

FIG. 1 is a fragmentary section view of a hermetic scroll type refrigeration compressor incorporating a disc type discharge valve in accordance with the present invention;

FIG. 2 is an enlarged section view of the disc type check valve shown in FIG. 1;

FIG. 3 is a section view of the check valve of FIG. 2, the section being taken along line 3—3 thereof;

FIG. 4 is a section view of the check valve of FIG. 2, the section being taken along line 4—4 thereof;

FIG. 5 is a view similar to that of FIG. 2 but showing an alternative embodiment of the present invention; and FIG. 6 is a view of the embodiment of FIG. 5 shown secured to the compressor's outer shell.

DESCRIPTION OF THE PREFERRED EMBODIMENT

Referring now to the drawings and in particular to FIG. 1, there is shown a scroll type refrigeration compressor 10 in accordance with the present invention. Compressor 10 comprises an outer shell or housing 14 within the lower portion of which is disposed an electric motor 16. Motor 16 is operative to drive a compressor assembly 24 disposed in the upper portion of shell 14 via a drive shaft 26 extending therebetween. As shown, compressor assembly 24 incorporates an upper fixed scroll member 28 and a lower scroll member 30 which is driven by drive shaft 26 in orbiting motion relative to the fixed scroll member 28. Fixed or non-orbiting scroll member 28 has a centrally located discharge passage 32 through which compressed fluid is discharged into a discharge muffler chamber 34 defined by an upper or top portion 36 of shell 14 and plate member 38 which is sealingly secured to the sidewalls of shell 14 in overlying relationship to non-orbiting scroll 28. A suitable seal 40 is provided between non-orbiting scroll 28 and plate 38 to insure the compressed fluid will pass through muffler inlet opening 42 into discharge muffler 34.

A disc type discharge check valve assembly 44 is provided being fitted within outlet opening 46 in top portion 36 so as to supply the compressed gas to the refrigeration system. A suction inlet fitting 48 is also provided in shell 14 for returning refrigerant to be compressed.

Referring now to FIGS. 2 through 4, discharge check valve assembly 44 comprises a first tubular member 50 having a generally radially outwardly extending annular flange 52 which is adapted to abut and be welded to the inner surface of top portion 36. In order to aid in this welding process and insure a secure fluid-tight seal, an annular axially outwardly projecting rib 54 is provided on flange 52. The other end of tubular member 50 has a generally radially inwardly extending flange portion 56 which overlies and retains a disc shaped member 58 seated against shoulder 60 defined by an enlarged diameter portion 62 of tubular member 50.

A second elongated tubular member 64 has an enlarged diameter end portion 66 telescopically fitted within tubular member 50. The other end of tubular member 64 extends outwardly through discharge opening 46 and is adapted to be connected to suitable conduits of the refrigeration system with which compressor 10 is to be utilized. As shown in FIG. 2, the inner end surface 68 of enlarged diameter end 66 is positioned in spaced relationship to disc member 58 and defines an annular stop surface or shoulder.

A valve member 70 is disposed within tubular member 50 and is sized so as to be freely movable between stop surface 68 and disc member 58. Valve member 70 has a center opening 72 of substantial diameter through which the compressed fluid is allowed to flow when valve member 70 is in an open position such as that shown in FIG. 2.

Disc member 58 has a pair of substantially identical arcuate cutout portions 74, 76 provided therein adjacent the outer periphery each of which are surrounded by a substantially planar surface portion 78 defining a valve seat for sealing engagement by facing surface 80 of valve member 70 when in a closed position.

Preferably tubular member 50 and valve member 70 are all fabricated from a suitable sheet metal such as steel whereas disc member 58 is preferably fabricated from a powdered metal material. Tubular member 64 may also be formed of steel or copper or other materials as dictated by the system requirements with which the compressor is to be utilized.

In operation, with compressor 10 running, the pressure within discharge muffler 34 will be above that existing downstream of disc type discharge check valve assembly 44 and hence the compressed fluid will flow through openings 74, 76 to thereby cause valve member to move to an open position whereby the compressed gas may flow through openings 74, 76 and 72 to the refrigeration system. Because opening 72 is slightly smaller in diameter than the inside diameter of tubular member 64, a pressure differential will exist across valve member 70 which will serve to retain it against the stop surface thus preventing the possibility of chattering occurring. When the compressor is shut down, the pressure within discharge muffler 34 may decrease below that existing downstream of valve assembly 44. Under these conditions, the pressure drop across opening 72 in valve member 70 will result in net force thereon causing it to move to the left as shown in FIG. 2 into a closed position wherein valve member 70 overlies openings 74 and 76 thereby preventing backflow of the compressed gas into the discharge muffler.

Referring now to FIGS. 5 and 6, another embodiment of the present invention is illustrated being indicated generally at 80. Disc type discharge valve 80 is generally similar to valve 44 described above except that a machined housing 82 is utilized in place of tubular member 50. Housing 82 includes a bore 84 extending therethrough which includes an enlarged diameter portion 86 adjacent the one end thereof which is designed to receive a disc shaped member 58'. Disc shaped member 58' is substantially identical to member 58 and includes openings 74' and 76'. The outer end portion of housing 82 is folded over the outer axially facing surface of disc member 58' to retain it in assembled relationship with housing 82. A second enlarged diameter portion 88 is also provided which is of a size somewhat less than portion 86 and defines a space within which disc member 70' is free to move. The axially inner end of enlarged diameter portion 88 defines an annular axially facing shoulder 90 which acts as a stop surface to limit movement of disc member 70'. Preferably, the spacing between the axially inwardly facing surface of member 58' and shoulder 90 will be selected relative to the size of disc member 70' so as to limit excessive cocking thereof which could prevent proper operation of valve member 80.

Housing 82 is generally cylindrical in shape and includes an annular axially facing shoulder 96 which is designed to abut the outer surface of compressor shell 56. A relatively small annular notch 98 is provided at the juncture of shoulder 96 and a reduced outer diameter portion 100. A suitable counterbore 92 is also provided opening inwardly from the other end of housing 82 and is designed to receive a suitable tubular fitting 94 for facilitating connection of the compressor to the refrigeration system. Preferably, fitting 94 will be sealingly secured to housing 82 by means of a suitable brazing or welding process.

In order to secure housing 82 to compressor shell 56', reduced outside diameter portion 100 is first inserted through a suitably sized opening 102 so that annular shoulder 96 is positioned in abutting relationship with the outer surface of shell 56'. Thereafter an axial force is exerted on housing 82 pressing shoulder 96 against the outer surface of shell 56' and housing 82 is rapidly rotated. The combination of this force and rotation will result in a localized heating due to the friction between housing 82 and shell 56' such that a portion of shoulder 96 and the abutting portion of shell 56' will be fused or welded together thus forming a fluid-tight seal therebetween. Notch 98 serves to reduce the total surface area of shoulder 96 thus increasing the pressure per unit area exerted by housing 82 on shell 56' for a given axial force. This increased pressure facilitates the above described spin welding process. It should be noted, however, that housing 82 may also be secured to shell 56' by a conventional welding process if desired in which case notch 98 would preferably be omitted.

The function and operation of disc valve assembly 80 is substantially identical to that described above with respect to valve assembly 44.

Thus, as may now be appreciated, the present invention provides an effective means to reduce backflow of compressed fluids which could result in increased reverse orbital movement of the orbiting scroll and the generation of annoying noise which means is easily and inexpensively fabricated yet provides long durable service. It should be noted that because the valve member is actuated between open and closed positions and held in the respective positions by the pressure drop thereacross rather than the force of the mass flow itself, the potential for chattering of the valve such as may occur with ball type check valves is substantially eliminated. This reduces the likelihood of damage to either the valve seat or stop surface as well. Further, because a positive stop for the open position is provided, the valve is less susceptible to damage in the event liquid is discharged such as may occur upon initial startup of the compressor or during defrost cycles.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

I claim:

1. In a hermetic refrigeration compressor having an outer shell, compressor means within said shell for compressing a fluid and a discharge flowpath for discharging said compressed fluid from said hermetic compressor, a discharge check valve assembly in said discharge flowpath for resisting backflow of said compressed fluid, said valve assembly comprising a housing having a bore therein opening out one end thereof, means defining a valve seat, said housing having an annular shoulder adjacent said one end and said valve seat being fitted within said one end of said housing and retained against said shoulder by a flange portion of said housing folded into overlying relationship with said valve seat means, a stop surface supported by said housing in spaced relationship to said valve seat and a substantially planar valve member freely movable within said housing between said valve seat and said stop surface in response to a pressure differential thereacross to define closed and open positions respectively whereby backflow of said compressed fluid into said compressor is effectively resisted.

2. A hermetic refrigeration compressor as set forth in claim 1 wherein said compressor is disposed within a sealed outer shell, said valve assembly is disposed within a discharge opening provided in said outer shell.

3. A hermetic refrigeration compressor as set forth in claim 1 wherein said valve member has a central opening therethrough, said central opening being sized so as to provide a fluid pressure drop thereacross.

4. A hermetic refrigeration compressor as set forth in claim 3 wherein said valve seat defining means include a fluid passage therethrough adjacent the periphery thereof, said valve member overlying and closing off said passage when said valve member is in said closed position.

5. A hermetic refrigeration compressor as set forth in claim 4 wherein said valve assembly is positioned within an outlet opening provided in said shell.

6. A hermetic refrigeration compressor as set forth in claim 1 wherein said housing comprises first and second tubular members telescopically interfitted, the end of one of said tubular members defining said stop surface.

7. A hermetic refrigeration compressor as set forth in claim 6 wherein said compressor is disposed within a sealed outer shell and said one of said first and second tubular members extends through a discharge opening in said outer shell.

8. A hermetic refrigeration compressor as set forth in claim 1 wherein said compressor is a scroll-type compressor.

9. A scroll type refrigeration compressor comprising:
an outer shell;
compressor means disposed in said shell, said compressor means including first and second interleaved scroll members supported for relative orbital movement therebetween so as to define moving fluid pockets of changing volume;
motor means disposed within said shell and operatively connected to drive said compressor means;
a discharge muffler within said shell;
discharge passage means for conducting compressed fluid from said compressor means to said discharge muffler; and
valve means disposed within a discharge opening in the outer shell, said valve means including a housing having a bore therein, means defining a valve seat secured within one end of said housing and having a fluid passage therethrough, a generally planar valve member movable within said bore defined by said housing and having a fluid passage therethrough, said valve member being freely movable in response to a pressure differential thereacross between a first open position wherein fluid flows from said discharge muffler through said discharge opening and a second closed position whereby fluid flow through said discharge opening into said discharge muffler is prevented, a discharge tube telescopically received within the other end of said housing, and means in said core defining a stop surface for limiting movement of said valve member in the open position, said bore having uniform dimensions between said valve seat and said stop surface for maintaining alignment of said valve member during movement thereof.

10. A refrigeration compressor as set forth in claim 9 wherein said valve member has a center opening therethrough, said opening being sized to create a pressure differential thereacross operative to effect opening and closing movement of said valve member.

11. A refrigeration compressor as set forth in claim 10 wherein said means defining said valve seat includes passage means therethrough positioned in radially spaced relationship to said center opening in said valve member whereby said valve member may close off said passage means when in a closed position.

12. A refrigeration compressor as set forth in claim 9 wherein said stop surface means comprise an end of said discharge tube.

13. A refrigeration compressor as set forth in claim 9 wherein said fluid passage through said valve seat means is radially offset from said fluid passage through said valve member.

14. A refrigeration compressor as set forth in claim 9 wherein said valve means is secured to said outer shell by spin welding.

15. A refrigeration compressor as set forth in claim 9 wherein said top surface engages a peripheral portion of said valve member.

16. A refrigeration compressor as set forth in claim 9 wherein said housing includes an annular shoulder adjacent said one end, said valve seat being retained in said housing by a flange portion thereof folded into overlying relationship to said valve seat.

* * * * *

UNITED STATES PATENT AND TRADEMARK OFFICE
CERTIFICATE OF CORRECTION

PATENT NO.  : 5,141,420
DATED       : August 25, 1992
INVENTOR(S) : Koman B. Nambiar It is certified that error appears in the above-identified patent and that said Letters Patent is hereby corrected as shown below:

Column 2, line 29, after "invention" insert -- . --.

Column 5, line 15, after "seat" insert -- , --.

Column 5, line 24, "is" should be -- being --.

Column 6, line 50, "top" should be -- stop --.

Signed and Sealed this

Twenty-eighth Day of December, 1993

Attest:

BRUCE LEHMAN

Attesting Officer

Commissioner of Patents and Trademarks